United States Patent
Grothe et al.

(10) Patent No.: US 10,155,218 B2
(45) Date of Patent: Dec. 18, 2018

(54) TIO₂ BASED CATALYST PRECURSOR MATERIAL, PRODUCTION THEREOF AND USE THEREOF

(71) Applicant: Huntsman P&A Germany GmbH, Duisburg (DE)

(72) Inventors: Sonja Grothe, Oberhausen (DE); Christian Spitzwieser, Rheinberg (DE)

(73) Assignee: Huntsman P&A Germany GmbH, Duisburg (DE)

( * ) Notice: Subject to any disclaimer, the term of this patent is extended or adjusted under 35 U.S.C. 154(b) by 32 days.

(21) Appl. No.: 15/119,739

(22) PCT Filed: Feb. 20, 2015

(86) PCT No.: PCT/DE2015/100070
§ 371 (c)(1),
(2) Date: Aug. 18, 2016

(87) PCT Pub. No.: WO2015/124149
PCT Pub. Date: Aug. 27, 2015

(65) Prior Publication Data
US 2017/0056855 A1     Mar. 2, 2017

(30) Foreign Application Priority Data
Feb. 21, 2014 (DE) ........................ 10 2014 102 312

(51) Int. Cl.
| | |
|---|---|
| *B01J 21/04* | (2006.01) |
| *B01J 21/06* | (2006.01) |
| *B01J 21/08* | (2006.01) |
| *B01J 21/12* | (2006.01) |
| *B01J 35/00* | (2006.01) |
| *B01J 35/02* | (2006.01) |
| *B01J 35/10* | (2006.01) |
| *B01J 37/00* | (2006.01) |
| *B01J 37/04* | (2006.01) |

(Continued)

(52) U.S. Cl.
CPC ........ *B01J 21/063* (2013.01); *B01D 53/9418* (2013.01); *B01J 21/04* (2013.01); *B01J 21/08* (2013.01); *B01J 21/12* (2013.01); *B01J 35/002* (2013.01); *B01J 35/023* (2013.01); *B01J 35/026* (2013.01); *B01J 35/1019* (2013.01); *B01J 35/1038* (2013.01); *B01J 35/1042* (2013.01); *B01J 37/0009* (2013.01); *B01J 37/0018* (2013.01); *B01J 37/0045* (2013.01); *B01J 37/04* (2013.01); *B01J 37/06* (2013.01); *B01J 37/082* (2013.01); *C01G 23/04* (2013.01); *C01G 23/047* (2013.01); *C10G 2/33* (2013.01); *C10G 45/00* (2013.01); *C10G 45/04* (2013.01); *C01P 2004/61* (2013.01); *C01P 2004/62* (2013.01); *C01P 2004/64* (2013.01); *C01P 2004/80* (2013.01); *C01P 2006/12* (2013.01); *C01P 2006/14* (2013.01); *C01P 2006/21* (2013.01); *C10G 2300/70* (2013.01)

(58) Field of Classification Search
CPC . B01J 21/04; B01J 21/063; B01J 21/08; B01J 21/12; B01J 35/002; B01J 35/023; B01J 35/026; B01J 35/1019; B01J 35/1038; B01J 35/1042; B01J 37/0009; B01J 37/0018; B01J 37/0045; B01J 37/04; B01J 37/06; B01J 37/082; B01D 53/9418; C01G 23/04; C01G 23/047; C10G 2/33; C10G 45/00; C10G 45/04
See application file for complete search history.

(56) References Cited

U.S. PATENT DOCUMENTS

| 3,919,119 A | 11/1975 | Romanski et al. |
| 4,113,660 A | 9/1978 | Abe et al. |
| (Continued) | | |

FOREIGN PATENT DOCUMENTS

| DE | 3736478 A1 | 5/1989 |
| DE | 10 2007 006 436 A1 | 8/2007 |
| (Continued) | | |

OTHER PUBLICATIONS

Notification of Transmittal of the International Preliminary Report on Patentability (Chapter I or Chapter II), PCT/DE2015/100070, dated Sep. 1, 2016.

(Continued)

*Primary Examiner* — Cam N. Nguyen
(74) *Attorney, Agent, or Firm* — Cahn & Samuels, LLP

(57) ABSTRACT

A TiO₂-based catalyst precursor material in powder form includes TiO₂ particles with the formula $TiO_{(2-x)}(OH)_{2x}$ (x=0-1). The particles are coated with one or more auxiliary shaping agents and after coating and drying have a specific surface area of at least 150 m²/g. The material has a content of 1) 50-99.5% by weight of the titanium-oxygen compound with the general formula $TiO_{(2-x)}(OH)_{2x}$, wherein x=0 to 1, or mixtures thereof, wherein the crystalline phases of the titanium-oxygen compound are in the anatase form, and 2) 0.5-50% by weight of an auxiliary shaping agent or mixtures thereof, which evaporates, sublimates and/or decomposes upon heating to temperatures below the transformation temperature from anatase to rutile, wherein the % by weight are relative to the total weight of the dried catalyst precursor material.

20 Claims, No Drawings

(51) Int. Cl.
- *B01J 37/06* (2006.01)
- *B01J 37/08* (2006.01)
- *B01D 53/94* (2006.01)
- *C01G 23/04* (2006.01)
- *C01G 23/047* (2006.01)
- *C10G 45/00* (2006.01)
- *C10G 45/04* (2006.01)
- *C10G 2/00* (2006.01)

(56) References Cited

U.S. PATENT DOCUMENTS

| | | | |
|---|---|---|---|
| 4,388,288 A | 6/1983 | Dupin et al. | |
| 4,992,401 A * | 2/1991 | Schweizer | B01J 29/12 502/66 |
| 5,593,781 A | 1/1997 | Nass et al. | |
| 6,660,243 B1 | 12/2003 | Proft et al. | |
| 7,662,476 B2 * | 2/2010 | Kobasa | B01J 21/063 427/215 |
| 7,943,115 B2 * | 5/2011 | Inoue | B01J 21/06 423/592.1 |
| 8,329,611 B2 * | 12/2012 | Shay | B01J 21/063 502/172 |
| 8,545,796 B2 * | 10/2013 | Chapman | B01D 53/9418 423/213.2 |
| 9,248,432 B2 * | 2/2016 | Hashimoto | A01N 59/20 |
| 9,248,433 B2 * | 2/2016 | Becker | B01J 23/888 |
| 9,421,519 B2 * | 8/2016 | Chapman | B01D 53/9418 |
| 2006/0116279 A1 * | 6/2006 | Kogoi | B01J 21/063 502/103 |
| 2007/0123594 A1 * | 5/2007 | Dogterom | B01J 21/066 518/716 |
| 2010/0133182 A1 * | 6/2010 | Sun | B01D 65/02 210/636 |
| 2013/0172176 A1 * | 7/2013 | Proft | B01D 53/8628 502/242 |

FOREIGN PATENT DOCUMENTS

| | | |
|---|---|---|
| EP | 0389041 A1 | 9/2009 |
| WO | 93/21127 A1 | 10/1993 |

OTHER PUBLICATIONS

English Abstract of DE 10 2007 006 436A1, Aug. 3, 2007.
English abstract of DE 3736478. May 11, 1989.

* cited by examiner

TIO$_2$ BASED CATALYST PRECURSOR MATERIAL, PRODUCTION THEREOF AND USE THEREOF

This U.S. patent application is a national stage application of PCT/DE2015/100070 filed on 20 Feb. 2015 and claims priority of German patent document DE 10 2014 102 312.9 filed on 21 Feb. 2014, the entireties of which are incorporated herein by reference.

The invention relates to a catalyst precursor material, and more precisely a TiO$_2$ based catalyst precursor material in powder form that contains at least one auxiliary shaping agent, methods for production thereof, use thereof for producing shaped parts, and use of the shaped parts as catalyst or catalyst carrier.

BACKGROUND OF THE INVENTION

The use of powder form titanium dioxide to produce shaped catalysts or catalyst carriers has been known for a long time. For certain applications, such as for "Claus catalysis", the titanium dioxide shaped parts can be used directly as catalyst without the addition of further materials.

For other applications, shaped parts containing titanium dioxide are treated with active metals such as Cr, Mo, W, Fe, Ru, Os, Co, Ni, Pd, Pt, Cu, Ag, V or Zn or metal oxides thereof. In these cases, the shaped parts containing titanium dioxide serve as "catalyst carriers". Combined processing of titanium dioxide with active materials to produce catalysts that contain titanium dioxide is also known. Thus for example, catalysts consisting of titanium dioxide, WO$_3$ and V$_2$O$_5$ are used for the selective catalytic reduction of nitrogen oxides in waste gases from furnaces, refuse incineration plants, gas turbines, industrial plants and engines.

Such titanium dioxide shaped parts, which are used as catalysts or catalyst carriers for fixed bed or fluid bed systems, must have sufficient mechanical strengths, since otherwise the catalyst may disintegrate when the reactor is filled and/or it may be crushed by the gas pressure, the thermal load and dynamic stresses during the reaction, or it may be destroyed by powerful abrasive forces.

U.S. Pat. No. 4,113,660 describes a method for producing catalysts and catalyst carriers (shaped parts) with improved mechanical strengths, which consist mainly of titanium dioxide. The shaped parts are produced by subjecting titanium dioxide or a precursor thereof to a calcining process at temperatures from 200 to 800° C. in the presence of metatitanic acid sol or gel.

U.S. Pat. No. 4,388,288 describes a method for producing porous titanium dioxide catalysts/catalyst carriers in the form of shaped parts, in which amorphous or poorly crystalline titanium dioxides in powder form are mixed with water and an auxiliary shaping agent. This paste is then shaped and annealed, typically at temperatures from 200-900° C.

U.S. Pat. No. 3,919,119 describes the production of catalyst carrier with improved abrasion properties, which comprise a mixture of a titanium chelate with titanium dioxide and a gelling agent. After the mixture has been gelled, it is dried and calcined. The titanium chelate complex used is preferably diethanolamine titanate.

EP 0389041A1 describes a method for preparing titanium dioxide extrudates from a mouldable paste, wherein the method includes steps of mixing and kneading a particulate titanium dioxide with water and an alkanolamine or ammonia or an ammonia releasing compound. The extrusion and calcining of the extruded pasty strands, typically at 450-750° C., is also described. EP 0389041 only describes titanium dioxide shaped parts with specific surface areas of less than 100 m$^2$/g that have been prepared by the addition of inorganic additives such as silica or zeolites.

Titanium dioxide-based powder form catalyst materials that have high specific surface areas and particularly which lend themselves well to the production of titanium dioxide shaped parts with high specific surface areas and have good mechanical strengths are not known in the related art.

The object of the invention is to overcome the drawbacks of the related art and to provide a catalyst precursor material on a titanium dioxide base with high specific surface area that is particularly suitable for the preparation of titanium dioxide shaped parts and at the same time has high mechanical strengths and a large specific surface area.

Now, the inventors have found that a TiO$_2$-based catalyst precursor material in powder form that contains one or more auxiliary shaping agents and has specific surface areas of at least 150 m$^2$/g can be used to prepare titanium dioxide shaped parts that have surprisingly good mechanical strengths and a high specific surface areas.

SUMMARY OF THE INVENTION

The invention relates correspondingly to a TiO$_2$-based catalyst precursor material in powder form containing TiO$_2$ particles with the formula TiO$_{(2-x)}$(OH)$_{2x}$ (x=0-1), wherein the particles are coated with one or more auxiliary shaping agents, and after coating and drying have a specific surface area of at least 150 m$^2$/g. Thus, the TiO$_2$-based catalyst precursor material according to the invention may contain particles of titanium dioxide and hydrated forms thereof that have been coated as described previously.

DETAILED DESCRIPTION OF THE INVENTION

Furthermore, the TiO$_2$-based catalyst precursor material in powder form containing the TiO$_2$ particles which can be described with the formula TiO$_{(2-x)}$(OH)$_{2x}$ (x=0-1) and those that include the aforementioned coating with auxiliary shaping agents may also comprise SiO$_2$, Al$_2$O$_3$ and/or hydrated forms thereof such as AlO(OH) or mixtures thereof, for example with a content of 50-99.5% by weight, preferably: 70-99.5% by weight TiO$_2$, 0.5-30% by weight, particularly 4 to 15% by weight auxiliary shaping agents and 0.1-50% by weight, particularly 0.1 to 15% by weight SiO$_2$, Al$_2$O$_3$ and/or hydrated forms thereof such as AlO(OH), as well as one or more auxiliary shaping agents. In this context, these optional components may preferably be added to the TiO$_2$ component before the auxiliary shaping agent is added.

Thus, depending on the neutralising agent used to neutralise the sulphuric acid still sticking to the TiO$_2$ particles, the catalyst precursor material in powder form may additionally include for example 0.5 to 30% by weight, particularly 5-25% by weight CaSO$_4$, BaSO$_4$ or mixtures thereof.

The percentages by weight cited in this description relate according to the invention to the total weight of the catalyst precursor material after drying for at least 120 minutes at 105° C. and add up cumulatively to 100% by weight of the total weight of the material, the optional components being included.

The catalyst precursor material in powder form particularly has a specific surface area of at least 150 m$^2$/g, more particularly at least 200 m$^2$/g, most particularly at least 300 m$^2$/g. At the same time, total pore volume (N$_2$ porosimetry) is at least 0.25 cm$^3$/g, particularly at least 0.3 cm$^3$/g, more particularly at least 0.4 cm³/g and most particularly 0.6 cm³/g. The crystalline parts of the titanium dioxide are preferably present in the anatase form. According to the invention, "in powder form" means that the particles typically have a size of <1 mm (sieving).

In the preferred embodiment, the TiO₂ particles of the catalyst precursor material according to the invention have an irregular shape that may be described approximately as spherical. They are not tubular, rod-like or platelet-shaped materials.

The surface of the catalyst precursor material in powder form is coated with the auxiliary shaping agent. This coating of the catalyst precursor material surface with one or more auxiliary shaping agents may be carried out particularly effectively with the method according to the invention, whereas a purely physical mixing of the catalyst precursor material in powder form with the auxiliary shaping agents does not usually result in a comparable surface covering and mouldability.

According to the invention, the catalyst precursor material in powder form is obtained by treating a suspension of TiO₂ particles having formula $TiO_{(2-x)}(OH)_{2x}$ ($0<x\leq1$) with the auxiliary shaping agent or mixtures of multiple auxiliary shaping agents as such, in solution or suspension, and thus coating the surface of said TiO₂ particles with the one or more auxiliary shaping agent(s).

In one embodiment, the suspension of TiO₂ particles having formula $TiO_{(2-x)}(OH)_{2x}$ ($0<x\leq1$) may be metatitanic acid with formula $TiO(OH)_2$, which is precipitated as an intermediate product during the sulphate process used to prepare TiO₂. In other production methods, the suspension of TiO₂ particles with formula $TiO_{(2-x)}(OH)_{2x}$ ($0<x\leq1$) may also be obtained from Ti-containing solutions, particularly hydrolysable compounds such as $TiOSO_4$— or $TiOCl_2$—, by precipitation, hydrolysis or sol-gel processes. The idea of coating the surface of the particles is also understood to mean coating within the pores to the extent possible. For the coating process, it is important according to the invention that enough OH groups are available to interact with the one or more auxiliary shaping agent, by protonation, for example, hydrogen bridge bonds, or possibly covalent bonds. This is usually not possible if the hydroxyl groups present on the surface of the particle have formed a Ti—O—Ti unit, releasing water, during drying at elevated temperature, for example. A TiO₂-containing material in which an auxiliary shaping agent is precipitated without interacting, particularly with one or more hydroxyl group(s) on the surface and thus usually after the metatitanic acid has been dried, typically does not exhibit comparable stability of the extrudates and does not fall within the scope of the invention.

The inventors discovered that one or more compounds which evaporate, sublimate or decompose at temperatures from below the transformation temperature from anatase to rutile (915° C.), preferably to below 600° C., particularly preferably to below 400° C., preferably with as little residue as possible, can be used to coat the surface of the $TiO_{(2-x)}(OH)_{2x}$ ($0<x\leq1$)/TiO₂ particles as auxiliary shaping agents. The auxiliary shaping agent facilitates the shaping and can remain between and/or on the particles of the catalyst precursor material in powder form, and can assist during a kneading step, and also help preferably to separate the particles of the catalyst precursor material in powder form. Thus substances may be added as auxiliary shaping agents that mainly promote the formation of a plastic mass during kneading and also help to increase the mechanical stability of the shaped part while it is being shaped. These auxiliary shaping agents are removed from the shaped part during calcining, complete removal being preferred.

The auxiliary shaping agent may preferably be an organic hydrocarbon, which may contain at least one functional group selected from hydroxy, carboxy, amino, imino, amido, ester, sulfonyl, keto, and thio analogues thereof, or multiple different representatives thereof, and which evaporates, sublimates or decomposes at temperatures from below the transformation temperature from anatase to rutile (915° C.), preferably to below 600° C., particularly preferably to below 400° C., during the preparation of the titanium dioxide shaped bodies according to the invention. A low-molecular organic hydrocarbon with at least one functional group containing one or more oxygen atoms, such as hydroxy or carboxy is preferred. In this context, a low-molecular organic hydrocarbon according to the invention is understood to be a hydrocarbon with one to twelve carbon atoms, and which contains at least one of the substituent groups selected from hydroxy, carboxy, amino, imino, amido, imido, ester, sulfonyl, keto and the thio analogues thereof, particularly hydroxy, carboxy.

Thus, the auxiliary shaping agent may be an acid, a base, an alkanol amine or another substance that evaporates, sublimates or decomposes at temperatures from below the transformation temperature from anatase to rutile (915° C.), preferably to below 600° C., particularly preferably to below 400° C., during calcining of the titanium dioxide shaped body according to the invention.

The auxiliary shaping agent is preferably an organic acid, particularly preferably a carboxylic acid, more particularly having one to six carbon atoms, including a di- and tricarboxylic acid, particularly preferably acetic acid, oxalic acid, tartaric acid, maleic acid or citric acid, more particularly oxalic acid. Nitric acid, ammonia, alkanol amine or an ammonia-releasing compound may preferably also be used as auxiliary shaping agents. Equally, carbohydrates such as cellulose, cellulose ether, methyl cellulose, glucose, polyacryl amine, polyvinyl alcohol, stearic acid, polyethylene glycol or mixtures thereof may be used as the auxiliary shaping agent. After the auxiliary shaping agent has evaporated sublimated or decomposed, the shaped part according to the invention has a residual carbon content of less than 2% by weight, preferably less than 1% by weight, relative to the weight of the shaped part after calcining.

Thus, given that the % by weight is relative to the total weight of the dried catalyst precursor material in each case, the invention relates more precisely to:

a TiO₂-based catalyst precursor material in powder form which contains TiO₂ particles having formula $TiO_{(2-x)}(OH)_{2x}$ ($x=0-1$), wherein the particles are coated with one or more auxiliary shaping agents, and after the coating and drying have a specific surface area of at least 150 m²/g, with a content of:

50-99.5% by weight of the titanium-oxygen compound with the general formula $TiO_{(2-x)}(OH)_{2x}$, wherein $x=0$ to 1, or mixtures thereof, 0.5-50% by weight of an auxiliary shaping agent, or mixtures thereof, which evaporates, sublimates or decomposes at temperatures from below the transformation temperature from anatase to rutile (915° C.), preferably to below 600° C., particularly preferably to below 400° C., for example during preparation of the titanium dioxide shaped part according to the invention;

a TiO₂-based catalyst precursor material in powder form as defined previously with a content of:

70-99.5% by weight of the titanium-oxygen compound with the general formula $TiO_{(2-x)}OH_{2x}$, wherein x=0 to 1, or mixtures thereof,
0.5-30% by weight of the auxiliary shaping agent;
a $TiO_2$-based catalyst precursor material in powder form as defined previously with an additional content of:
0.1-15% by weight $SiO_2$ and/or $Al_2O_3$ or hydrated forms thereof
a $TiO_2$-based catalyst precursor material in powder form with a content of:
40-60% by weight of the titanium-oxygen compound having the general formula $TiO_{(2-x)}(OH)_{2x}$, wherein x=0 to 1, or mixtures thereof,
40-60% by weight $SiO_2$ and/or $Al_2O_3$,
0.5-20% by weight of the auxiliary shaping agent;
a $TiO_2$-based catalyst precursor material in powder form as defined previously with an additional content of:
0.1-30% by weight $CaSO_4$, $BaSO_4$ or mixtures thereof
a $TiO_2$-based catalyst precursor material in powder form as defined previously with an auxiliary shaping agent selected from
an organic hydrocarbon containing at least one functional group selected from hydroxy, carboxy, amino, imino, amido, ester, sulfonyl, keto, and thio analogues thereof, or multiple different representatives thereof, and which evaporates, sublimates or decomposes at temperatures from below the transformation temperature from anatase to rutile (915° C.), preferably to below 600° C., particularly preferably to below 400° C., for example during the preparation of the titanium dioxide shaped body according to the invention, for example an organic acid, preferably a carboxylic acid, particularly preferably acetic acid, oxalic acid, tartaric acid, maleic acid or citric acid, particularly preferably oxalic acid,
ammonia, alkanol amine or an ammonia-releasing compound,
carbohydrates such as cellulose, cellulose ether, glucose, polyacryl amine, polyvinyl alcohol, stearic acid, polyethylene glycol or mixtures thereof
a $TiO_2$-based catalyst precursor material in powder form as defined previously having a specific surface area of at least 150 m²/g, preferably at least 200 m²/g, and particularly preferably at least 300 m²/g.
a $TiO_2$-based catalyst precursor material in powder form as defined previously with a pore volume ($N_2$ desorption, total) of at least 0.25 cm³/g, preferably at least 0.30 cm³/g, particularly preferably at least 0.4 cm³/g, most preferably 0.6 cm³/g.

According to the invention, hydrated precursor forms of $TiO_2$, $SiO_2$ and/or $Al_2O_3$ are included. The catalyst precursor material in powder form may be prepared by adding one or more auxiliary shaping agents, preferably in an aqueous solution, to a usually aqueous dispersion of titanium dioxide or a titanium dioxide precursor (generally $TiO_{(2-x)}(OH)_{2x}$ (x=0-1)) followed by drying. This titanium dioxide dispersion may also contain further components such as $SiO_2$ and/or $Al_2O_3$ and/or $CaSO_4$ and the hydrated forms thereof, such as AlO(OH), sulphate ions, phosphate ions and other typical accompanying substances such as Na, K, etc. depending on the preparation of the titanium dioxide dispersion. In one embodiment, the sulphate content of the catalyst precursor material in powder form is less than 2.0% by weight, particularly less than 1.5% by weight relative to the total weight of the dried catalyst precursor material.

Thus, the invention also relates to a method for producing the $TiO_2$-based catalyst precursor material in powder form, in which:
a suspension of titanium oxide hydrate and/or hydrated titanium dioxide with general formula $TiO_{(2-x)}(OH)_{2x}$ (0<x≤1) or mixtures thereof, (called "titanium dioxide suspension" here) is mixed with the auxiliary shaping agent or mixtures thereof, and
the suspension thus obtained is dried at a temperature below 150° C. and undergoes a grinding step if necessary.

The auxiliary shaping agent or the mixture thereof may be added in dry form, in suspension or in solution.

In one embodiment, "-titanium dioxide suspensions" are preferably used
which have a Ti content of 100-400 g $TiO_2$/l calculated as titanium dioxide,
which have an average particle size of 5 nm-5 μm, preferably 10 nm-2000 nm, particularly 10 nm-1000 nm, preferably 50 nm-1000 nm, particularly preferably 20 nm-800 nm, most particularly preferably 30-200 nm, and
which have a specific surface area (5-point BET, $N_2$) of 50-500 m²/g, preferably 100-400 m²/g, particularly preferably 250-400 m²/g after drying for at least 120 min at 105° C.
which after drying for at least 120 min at 105° C. are preferably in the anatase phase, the crystalline phase of the particles preferably consists of anatase according to x-ray diffractogram analysis.

Another embodiment relates to the method for producing $TiO_2$-based catalyst precursor material in powder form, in which:
a suspension of metatitanic acid is neutralised with an alkaline solution, the neutralised metatitanic acid is washed with water,
the washed metatitanic acid is re-absorbed in an aqueous phase, preferably as filter cake,
a preferably aqueous solution of the auxiliary shaping agent is added to the suspension obtained,
the suspension obtained is dried at a temperature below 150° C. and subjected to a grinding step if necessary.

The metatitanic acid used contains titanium-oxygen compounds and may contain both free and bound sulphuric acid, wherein the crystalline fractions of the titanium-oxygen compounds are in the anatase phase and have a typical crystal size of about 5-10 nm. The titanium-oxygen compound may be described with the general formula $TiO_{(2-x)}(OH)_{2x}$, wherein (0<x≤1) is. Metatitanic acid is produced as an intermediate product when $TiO_2$ is prepared according to the sulphate method. In the sulphate method, ilmenite and/or slag is digested with 90% $H_2SO_4$, the cake obtained is dissolved in water, and the solution is clarified. The addition of scrap iron converts dissolved trivalent iron to the bivalent form, since $Fe^{3+}$ is unfavourably precipitated as $Fe(OH)_3$ together with the metatitanic acid and would be adsorbed therein. Depending on the Fe content in the solution, $FeSO_4 \times 7H_2O$ is precipitated after the solution cools and is removed from the system. In the subsequent hydrolysis, the $TiOSO_4$ is converted into metatitanic acid. Other hydrated forms such as orthotitanic acid are transformed into metatitanic acid by splitting off $H_2O$.

According to the invention, the (sulphuric acid) metatitanic acid may be neutralised particularly with an alkali, preferably selected from NaOH, ammonia, calcium carbonate, calcium hydroxide or also $Ba(OH)_2$, particularly preferably with NaOH.

The neutralised metatitanic acid obtained is preferably washed with water until it has a conductivity not more than 500 µS/cm, after which the washed filter cake is turned into a slurry or dispersion, preferably with a stirrer, particularly preferably with a dissolver.

After the addition of the preferably aqueous solution of the auxiliary shaping agent, the suspension obtained may optionally undergo a maturation step, preferably for 10 min to 24 h, particularly preferably for 15 min to 3 h, preferably at temperatures from T=20-80° C.

According to the invention, the suspension obtained after the maturation step is dried at a temperature below 150° C., preferably in a temperature range from 90-140° C. to prevent the auxiliary shaping agent from evaporating or decomposing, more particularly by spray drying or pulverising/drying and, if necessary, also undergoes a grinding step to comminute any agglomerates that may have formed. Since the hot gases used in pulverising/drying are typically at temperatures from 250° to 300° C., and at 250° to 500°, occasionally even up to 600° C. during spray drying, the product flow and product temperature must be monitored carefully to prevent the auxiliary shaping agent from evaporating or decomposing. For this purpose, temperatures at product discharge are in the range from 90-140° C. in the pulverising/drying process, and in the range from about 120 to 130° C., more particularly 125° C., at the product discharge with spray drying.

The $TiO_2$-based catalyst precursor materials in powder form according to the invention obtained in this way may be used according to the invention to produce shaped bodies according to the invention by applying the following method:

1. Preparing an aqueous titanium dioxide paste from:
   $TiO_2$-based catalyst precursor material in powder form according to the invention according to the invention with auxiliary shaping agent
   A peptiser, preferably hydrochloric acid, sulphuric acid, nitric acid, acetic acid, oxalic acid.
   Water, preferably demineralised water, and as optional components
   i. Plasticisers such as cellulose, clay, polyvinyl alcohols, polyethylene glycol, preferably cellulose, particularly preferably methyl cellulose
   ii. Binders such as $TiO_2$ sol, $TiOSO_4$ solution, alumina, $SiO_2$ sol or clays, preferably $TiO_2$ sol, $TiOSO_4$ solution or AlO(OH) (boehmite or pseudoboehmite)
   iii. Bases, preferably ammonia or compounds containing amine
   iv. Lubricants such as glycerine
   v. Pore-forming agents such as starch or carbon black
   The water content of the paste is preferably also selected such that the paste can be forced through a nozzle with a diameter of 1-5 mm by an extruder (twin screw) at pressures from 1 to 100 bar, or up to 200 bar if necessary;
2. Kneading the paste obtained, in a double-Z kneader, typically for 30-60 minutes;
3. Shaping, e.g., extruding the paste to produce shaped parts such as strings with diameters from 1-5 mm for example and lengths typically of 10-25 mm;
4. Drying the shaped parts such as extrudates, initially at 20 to 30° C., particularly at 25° C., for a period of more than 1, particularly more than 6, most particularly more than 12 hours, then at 80-120° C., preferably at 90° C., for 60 to 120 min, and then calcining at 300 to 600° C., particularly at 350 to 600° C., particularly preferably at 350 to 450° C., more particularly at 400° C. for 1-4 hours.

The shaped parts produced from the catalyst precursor materials according to the invention normally have the following properties:
Crushing strength>5, particularly >8 N/mm, preferably >10 N/mm, particularly preferably >15, most particularly preferably 25 N/mm;
Spec. surface area>80, particularly >100 m²/g, preferably >120 m²/g, particularly preferably >150 m²/g, most particularly preferably >200 m²/g;
$N_2$ pore volumes>0.2 cm³/g, preferably >0.3 cm³/g, particularly preferably >0.6 cm³/g.

The shaped parts produced from the catalyst precursor materials according to the invention may be used according to the invention as catalysts or catalyst carriers for catalytically active metals such as V, W, Co, Mo, Ni, Fe, Cu, Cr, Ru, Pd, Pt, Ag, Zn for applications in
Photocatalysis
Claus catalysis
Claus tail gas treatment
SCR, hydrotreating, gas-to-liquid, and Fischer-Tropsch processes.

The present invention will be explained further in the following experimental part including the production examples and comparison examples.

Description of Measurement Methods Used
Determination of Carbon
The sample is combusted in an oxygen stream at 1300° C. The resulting carbon dioxide is detected by infrared analysis.

Determination of Sulphur
The sample is combusted in an oxygen stream at 1400° C. The resulting sulphur dioxide is detected by infrared analysis. The calculated S content is then converted to $SO_4$.

Determination of Titanium Calculated as $TiO_2$
The material is digested with sulphuric acid/ammonium sulphate or potassium disulphate. It is then reduced with Al to $Ti^{3+}$. Titration with ammonium iron(III) sulphate (indicator: $NH_4SCN$).

Determination of Specific Surface Area (Multipoint Method) and Analysis of the Pore Structure in the Nitrogen—Gas Sorption Method ($N_2$ Porosimetry)
The specific surface area and the pore structure (pore volume and pore diameter) are calculated by $N_2$ porosimetry with the Autosorb 6 or 6B from Quantachrome GmbH. The BET surface area (Brunnauer, Emmet and Teller) is determined in accordance with DIN ISO 9277, the pore distribution is measured in accordance with DIN 66134.

Sample Preparation ($N_2$ Porosimetry)
The sample weighed into the measurement cell is predried in a vacuum in the heating station for 16 h. Then it is heated to 180° C. in about 30 min in a vacuum. The temperature is then maintained for an hour, still under vacuum. The sample is considered to be sufficiently degassed when a pressure of 20-30 millitorr is reached at the degasser and the needle of the vacuum display remains stable for about 2 minutes after the vacuum pump has been disconnected.

Measurement/Evaluation ($N_2$ Porosimetry)
The entire $N_2$ isotherm is measured with 20 adsorption points and 25 desorption points. The measurements were evaluated as follows:
Specific Surface Area (BET Multipoint)
5 measurement points in the evaluation range from 0.1 to 0.3 p/p0

Evaluation of Total Pore Volume

The pore volume was evaluated using the Gurvich rule (determination using the last adsorption point)

The total pore volume is determined using the Gurvich rule in accordance with DIN 66134. According to the Gurvich rule, the total pore volume of a sample is determined from the last pressure point during adsorption measurement:

p. pressure of the sorptive
p0. saturation vapour pressure of the sorptive
Vp. specific pore volume according to the Gurvich rule (total pore volume at p/Po 0.99), effectively the last adsorption pressure point achieved during the measurement.

Evaluation of Average Pore Diameter (Hydraulic Pore Diameter)

For the calculation, the relationship $4Vp/A_{BET}$ is used, corresponding to the "average pore diameter". $A_{BET}$ specific surface area in accordance with ISO 9277.

Determination of Extrudate Strength

The strength of the extrudates is measured by applying a pneumatic pressure to an extrudate sample body between two horizontally arranged, flat metal plates. A 4-5 mm long sample of the extrudate is placed in the middle of a lower, fixed position plate. The upper, pneumatically controlled opposite plate is moved downward slowly until it touches the extrudate sample lightly. The pressure is then increased continuously until the extrudate sample is destroyed (tearing, fracturing or splintering). The pressure needed to destroy the extrudate sample is read off in kg from a digital display. To arrive at the strength in N/mm, the value read off in kg is multiplied by 9.81 and divided by the length of the extrudate sample. The strength of the extrudates is calculated on the basis of the average from 30 measurements.

Determination of Phase and Crystallite Size According to Scherrer

In order to determine the crystal form (phase identification), an X-ray diffractogram is recorded. For this, the intensities of the X-rays bent towards the diffraction angle 2 theta at the lattice planes of a crystal are measured according to the Bragg condition. The X-ray diffraction pattern is typical for a phase.

Performance and Evaluation:

The material for analysis is spread onto the preparation support with the aid of a specimen slide. The powder diffractometry data is evaluated using the JCPDS powder diffractometry database. The phase is identified when the measured diffraction diagram matches the stored line pattern.

The measurement conditions are typically: 2 theta=10°-70°, measured in steps of 2 theta=0.02°, measurement time per step: 1.2 s.

The crystallite size is determined using the Scherrer method from the peak width at half height of the anatase reflex for 2 theta=25.3° according to the following formula:

$$D \text{ crystallite} = K*I/(S*\cos(\text{theta}))$$

wherein: D crystallite: crystallite size [nm]
K: shape constant=0.9
Theta: Angular position of measurement reflex 2 theta/2
S: peak width at half height of the measurement reflex
I: wavelength of the X-ray beam used Determination of Average Particle Size To determine the average particle size of titanium oxide hydrate and/or hydrated titanium dioxide, the aqueous "titanium dioxide suspension" is first diluted in a solution of 1 g calgon/l in deionised water to a concentration of approx. 0.4 g $TiO_2$ in 60 ml solution. The "titanium dioxide suspension" diluted in this way is then dispersed, initially for 5 min in an ultrasonic bath (e.g. Sonorex Super RK106 from Bandelin) with stirring and then for 5 min with an ultrasonic probe (Sonifier W-450 manufactured by Branson with Goldbooster for amplitude amplification and ¾ inch high-performance resonator). The particle size distribution is determined using a photon correlation spectrometer with Zetasizer Advanced Software, e.g., Zetasizer 1000Hsa produced by Malvern. A measurement with multimodal calculation is carried out at a measuring temperature of 25° C. The d50 value of the volume distribution, corresponding to the mass distribution taking into account density, is specified as the average particle size d50.

EXAMPLES

Example 1

Hombikat MTSA (metatitanic acid, a commercial product manufactured by Sachtleben Chemie GmbH) is neutralised with caustic soda to a pH value of 6.5 and washed with water until the conductivity in the filtrate is below 200 µS/cm. The filter cake is redispersed and reacted with an aqueous solution of oxalic acid (corresponding to 6 g oxalic acid dihydrate to 94 g $TiO_2$). This suspension is allowed to mature for 1 h at T=25° C. and then spray dried, the product discharge temperature being T=110+/−5° C. The properties of this powder are listed in table 1.

400 g of the powder and 64 g of an aqueous 2.5% solution of methyl cellulose are placed in the mixing trough of the double-Z kneader and mixed for about 1 min. Then, 34.4 g of 10% by weight hydrochloric acid is added together with as much demineralised water as is needed to impart a plastic behaviour to the kneading mass (about 70 g). This mixture is then kneaded for 30 minutes. Then, 24 g ammonia water (25% solution) is added and kneading continues for another 30 min. The kneaded mass is then passed through a 4 mm die by extrusion at a pressure of 40-70 bar and cut to the desired length (approx. 15-20 mm). The extrudates prepared in this way are initially air dried and then heated to 90° C. for 60 min, then heated to the calcining temperature of 400° C. over several hours and held at this temperature for 120 min before being cooled to room temperature.

Example 2

Hombikat MTSA (a commercial product manufactured by Sachtleben Chemie GmbH) is neutralised with caustic soda to a pH value of 6.5 and washed with water until the conductivity in the filtrate is below 200 µS/cm. The filter cake is redispersed and reacted with an aqueous solution of oxalic acid (corresponding to 8 g oxalic acid dihydrate to 92 g $TiO_2$). This suspension is allowed to mature for 2 h at T=50° C. and then spray dried, the product discharge temperature being T=110+/−5° C. The properties of this spray dried $TiO_2$ or titanium oxide hydrate powder are listed in table 1.

400 g of the powder and 64 g of an aqueous 2.5% solution of methyl cellulose are placed in the mixing trough of the double-Z kneader and mixed for about 1 min. Then, 16.4 g of 10% by weight hydrochloric acid is added together with as much demineralised water as is needed to impart a plastic behaviour to the kneading mass (about 94 g). This mixture is then kneaded for 30 minutes. Then, 11 g ammonia water (25% solution) and 44 ml demineralised water are added and kneading continues for another 30 min. The kneaded mass is then passed through a 3 mm die by extrusion at a pressure of 40-70 bar and cut to the desired length (approx. 15-20 mm). The extrudates prepared in this way are initially air dried and then tempered as described in Example 1.

Example 3

Hombikat MTSA (a commercial product manufactured by Sachtleben Chemie GmbH) is neutralised with caustic soda to a pH value of 6.5 and washed with water. The filter cake is redispersed and reacted with maleic acid while stirring (corresponding to 6 g maleic acid to 94 g $TiO_2$). This suspension is allowed to mature for 2 h at T=50° C. and then spray dried, the product discharge temperature being T=110+/−5° C. The properties of this spray dried $TiO_2$ or titanium oxide hydrate powder are listed in table 1.

Example 4

Hombikat MTSA (a commercial product manufactured by Sachtleben Chemie GmbH) is neutralised with caustic soda to a pH value of 6.5 and washed with water. The filter cake is redispersed and reacted with citric acid monohydrate while stirring (corresponding to 6 g citric acid monohydrate to 94 g $TiO_2$). This suspension is allowed to mature for 2 h at T=50° C. and then spray dried, the product discharge temperature being T=110+/−5° C. The properties of this spray dried $TiO_2$ or titanium oxide hydrate powder are listed in table 1.

400 g of the powder and 64 g of an aqueous 2.5% solution of methyl cellulose are placed in the mixing trough of the double-Z kneader and mixed for about 1 min. Then, 32.8 ml of 10% by weight hydrochloric acid is added together with as much demineralised water as is needed to impart a plastic behaviour to the kneading mass (about 75 g). This mixture is then kneaded for 30 minutes. Then, 17.2 ml ammonia water (25% solution) is added and kneading continues for another 30 min. The kneaded mass is then passed through a 3 mm die by extrusion at a pressure of 40-70 bar and cut to the desired length (approx. 15-20 mm). The extrudates prepared in this way are initially air dried and then tempered as described in Example 1.

Example 5

Hombikat MTSA (a commercial product manufactured by Sachtleben Chemie GmbH) is neutralised with caustic soda to a pH value of 6.5 and washed with water. The filter cake is redispersed and reacted with tartaric acid (corresponding to 6 g tartaric acid to 94 g $TiO_2$) while stirring. This suspension is allowed to mature for 2 h at T=50° C. and then spray dried, the product discharge temperature being T=110+/−5° C. The properties of this spray dried $TiO_2$ or titanium oxide hydrate powder are listed in table 1.

Example 6

Hombikat MTSA (a commercial product manufactured by Sachtleben Chemie GmbH) is neutralised with caustic soda to a pH value of 6.5 and washed with water. The filter cake is redispersed and reacted with triethanol amine (corresponding to 1 g triethanol amine to 99 g $TiO_2$) while stirring. This suspension is allowed to mature for 2 h at T=50° C. and then spray dried, the product discharge temperature being T=110+/−5° C. The properties of this spray dried $TiO_2$ or titanium oxide hydrate powder are listed in table 1.

Example 7

A commercially available titanium oxide hydrate suspension ($TiO_{(2-x)}(OH)_{2x}$ ($0<x \leq 1$)) with a Ti content of approx. 200 g $TiO_2$/l calculated as titanium dioxide, an average particle size of 48 nm (measured by PCS measurement according to ultrasonic probe dispersion and having a specific surface area of 350 $m^2$/g ($N_2$ 5 point BET, measured after drying at 105° C.) is used as the educt (e.g., Hombikat M310 Suspension, a commercial product manufactured by Sachtleben Chemie GmbH). This suspension is reacted with oxalic acid dihydrate (corresponding to 6 g oxalic acid dihydrate to 94 g $TiO_2$) while stirring. This suspension is stirred for 24 h and then spray dried, the product discharge temperature being T=110+/−5° C. The properties of this spray dried $TiO_2$ or titanium oxide hydrate powder are listed in table 1

400 g of the powder and 64 g of an aqueous 2.5% solution of methyl cellulose are placed in the mixing trough of the double-Z kneader and mixed for about 1 min. Then, the pH value of the kneaded mass is adjusted to pH=1 by adding hydrochloric acid together with as much demineralised water as is needed to impart a plastic behaviour to the kneaded mass. This mixture is then kneaded for 30 minutes. Then, the pH value of the kneaded mass is adjusted to pH=6 by adding ammonia water (25% solution) and kneading continues for another 30 min. The kneaded mass is then passed through a 3 mm die by extrusion at a pressure of 140-180 bar and cut to the desired length (approx. 15-20 mm). The extrudates prepared in this way are initially air dried and then tempered as described in Example 1.

Example 8

Hombikat MTSA (a commercial product manufactured by Sachtleben Chemie GmbH) is neutralised with caustic soda to a pH value of 6.5 and washed with water. The filter cake is redispersed and reacted with methyl cellulose solution (methyl cellulose 4000 P2) (corresponding to 0.5 g methyl cellulose to 99.5 g $TiO_2$) while stirring. This suspension is allowed to mature for 2 h at T=50° C. and then spray dried, the product discharge temperature being T=110+/−5° C. The properties of this spray dried $TiO_2$ or titanium oxide hydrate powder are listed in table 1.

400 g of the powder and 64 g of an aqueous 2.5% solution of methyl cellulose are placed in the mixing trough of the double-Z kneader and mixed for about 1 min. Then, the pH value of the kneaded mass is adjusted to pH=1.5 by adding hydrochloric acid together with as much demineralised water as is needed to impart a plastic behaviour to the kneaded mass. This mixture is then kneaded for 30 minutes. Then, the pH value of the kneaded mass is adjusted to pH=5 by adding ammonia water (25% solution) and kneading continues for another 30 min. The kneaded mass is then passed through a 3 mm die by extrusion and cut to the desired length (approx. 15-20 mm). The extrudates prepared in this way are initially air dried and then heated to 90° C. for 60 min, then heated to the calcining temperature of 450° C. over several hours and held at this temperature for 120 min before being cooled to room temperature.

Example 9

A commercially available titanium oxide hydrate suspension ($TiO_{(2-x)}(OH)_{2x}$ ($0<x \leq 1$)) with a Ti content of approx. 300 g $TiO_2$/l calculated as titanium dioxide, an average particle size of 950 nm (measured by PCS measurement according to ultrasonic probe dispersion and having a specific surface area of 350 $m^2$/g ($N_2$ 5 point BET, measured after drying at 105° C.) is used as the educt (e.g., Hombikat M210 Suspension, a commercial product manufactured by Sachtleben Chemie GmbH). This suspension is adjusted to pH=3.8 with acetic acid while stirring. This suspension is then spray dried, the product discharge temperature being T=110+/−5° C. The properties of this spray dried $TiO_2$ or titanium oxide hydrate powder are listed in table 1

400 g of the powder and 64 g of an aqueous 2.5% solution of methyl cellulose are placed in the mixing trough of the double-Z kneader and mixed for about 1 min. Then, the pH value of the kneaded mass is adjusted to pH=1 by adding hydrochloric acid together with as much demineralised water as is needed to impart a plastic behaviour to the kneaded mass. This mixture is then kneaded for 30 minutes. Then, the pH value of the kneaded mass is adjusted to pH=6 by adding ammonia water (25% solution) and kneading continues for another 30 min. The kneaded mass is then passed through a 3 mm die by extrusion and cut to the desired length (approx. 15-20 mm). The extrudates prepared in this way are initially air dried and then heated to 90° C. for 60 min, then heated to the calcining temperature of 350° C. over several hours and held at this temperature for 120 min before being cooled to room temperature.

Example 10

Hombikat MTSA (a commercial product manufactured by Sachtleben Chemie GmbH) is neutralised with caustic soda to a pH value of 6.5 and washed with water. The filter cake is redispersed. Then, ammonia is added with stirring to adjust the pH value of the suspension to pH=6.9. This suspension is then spray dried, the product discharge temperature being T=110+/−5° C. The properties of this spray dried $TiO_2$ or titanium oxide hydrate powder are listed in table 1.

400 g of the powder and 64 g of an aqueous 2.5% solution of methyl cellulose are placed in the mixing trough of the double-Z kneader and mixed for about 1 min. Then, the pH value of the kneaded mass is adjusted to pH=1 by adding hydrochloric acid together with as much demineralised water as is needed to impart a plastic behaviour to the kneaded mass. This mixture is then kneaded for 30 minutes. Then, the pH value of the kneaded mass is adjusted to pH=6 by adding ammonia water (25% solution) and kneading continues for another 30 min. The kneaded mass is then passed through a 3 mm die by extrusion and cut to the desired length (approx. 15-20 mm). The extrudates prepared in this way are initially air dried and then heated to 90° C. for 60 min, then heated to the calcining temperature of 350° C. over several hours and held at this temperature for 120 min before being cooled to room temperature.

Example 11

Hombikat MTSA (a commercial product manufactured by Sachtleben Chemie GmbH) is neutralised with caustic soda to a pH value of 6.5 and washed with water. The filter cake is redispersed. Then, nitric acid is added with stirring to adjust the pH value of the suspension to pH=3.2. This suspension is then spray dried, the product discharge temperature being T=110+/−5° C. The properties of this spray dried $TiO_2$ or titanium oxide hydrate powder are listed in table 1.

400 g of the powder and 64 g of an aqueous 2.5% solution of methyl cellulose are placed in the mixing trough of the double-Z kneader and mixed for about 1 min. Then, the pH value of the kneaded mass is adjusted to pH=1 by adding hydrochloric acid together with as much demineralised water as is needed to impart a plastic behaviour to the kneaded mass. This mixture is then kneaded for 30 minutes. Then, the pH value of the kneaded mass is adjusted to pH=6 by adding ammonia water (25% solution) and kneading continues for another 30 min. The kneaded mass is then passed through a 3 mm die by extrusion and cut to the desired length (approx. 15-20 mm). The extrudates prepared in this way are initially air dried and then heated to 90° C. for 60 min, then heated to the calcining temperature of 350° C. over several hours and held at this temperature for 120 min before being cooled to room temperature.

Example 12

400 g of the powder of Example 1 and 64 g of an aqueous 2.5% solution of methyl cellulose are placed in the mixing trough of the Double-Z kneader and mixed for about 1 min. Then, 34 g of 10% by weight hydrochloric acid and 20 g of an acid titanium dioxide sol ("HOMBIKAT XXS 100" a commercial product manufactured by Sachtleben Chemie GmbH) are added together with as much demineralised water as is needed to impart plastic behaviour to the kneaded mass (about 74 g). This mixture is then kneaded for 30 minutes. Then, 7.7 ml ammonia water (25% solution) is added and kneading continues for another 30 min. The kneaded mass is then passed through a 3 mm die by extrusion under a pressure of 120-150 bar and cut to the desired length (approx. 15-20 mm). The extrudates prepared in this way are initially air dried and then heated to 90° C. for 60 min, then heated to the calcining temperature of 400° C. over several hours and held at this temperature for 120 min before being cooled to room temperature Example 13

400 g of the powder of Example 1 and 64 g of an aqueous 2.5% solution of methyl cellulose are placed in the mixing trough of the Double-Z kneader and mixed for about 1 min. Then, 34 g of 10% by weight hydrochloric acid and 30 g of an acid titanium dioxide sol ("HOMBIKAT XXS 100" a commercial product manufactured by Sachtleben Chemie GmbH) are added together with as much demineralised water as is needed to impart plastic behaviour to the kneaded mass. This mixture is then kneaded for 30 minutes. Then, 7.4 ml ammonia water (25% solution) is added and kneading continues for another 30 min. The kneaded mass is then passed through a 3 mm die by extrusion under a pressure of 120-150 bar and cut to the desired length (approx. 15-20 mm). The extrudates prepared in this way are initially air dried and then heated to 90° C. for 60 min, then heated to the calcining temperature of 350° C. over several hours and held at this temperature for 120 min before being cooled to room temperature.

Comparison Example 1

400 g Hombikat M211 (titanium dioxide, a commercial product manufactured by Sachtleben) and 64 g of an aqueous 2.5% solution of methyl cellulose are placed in the mixing trough of the double-Z kneader and mixed for about 1 min. Then, 60 g of 10% by weight hydrochloric acid is added together with as much demineralised water as is needed to impart a plastic behaviour to the kneading mass (about 70 ml). This mixture is then kneaded for 30 minutes. Then, 20 g ammonia water (25% solution) and 20 ml demineralised water are added and kneading continues for 30 min. The kneaded mass is then passed through a 3 mm die by extrusion at a pressure of 40-70 bar and cut to the desired length (approx. 15-20 mm). The extrudates prepared in this way are initially air dried and then tempered as described in Example 1.

Comparison Example 2

Hombikat MTSA (a commercial product manufactured by Sachtleben) is neutralised to a pH value of 6.6 with caustic soda and washed with water until the filtrate conductivity is <200 μS/cm. The filter cake is redispersed and spray dried. The properties of this spray dried $TiO_2$ or titanium oxide hydrate powder are listed in table 1.

400 g of the powder are placed in the mixing trough of the double-Z kneader with 100 g oxalic acid (9.1% solution) and 64 g of an aqueous 2.5% solution of methyl cellulose and mixed for about 1 min. Then, 27 g of 10% by weight hydrochloric acid is added. This mixture is then kneaded for 30 minutes. Then, 12 g ammonia water (25% solution) and 35 ml demineralised water are added and kneading continues for another 30 min. The kneaded mass is then passed through a 3 mm die by extrusion at a pressure of 40-70 bar and cut to the desired length (approx. 15-20 mm). The extrudates prepared in this way are initially air dried and then tempered as described in Example 1.

Comparison Example 3

The typical properties of Hombikat M311 powder (titanium dioxide, a commercial product manufactured by Sachtleben) are listed in table it.

400 g of Hombikat M311 (a commercial product manufactured by Sachtleben) and 64 g of an aqueous 2.5% solution of methyl cellulose are placed in the mixing trough of the double-Z kneader and mixed for about 1 min. Then, the pH value of the kneaded mass is adjusted to pH=1 by adding hydrochloric acid together with as much demineralised water as is needed to impart a plastic behaviour to the kneading mass. This mixture is then kneaded for 30 minutes. Then, the pH value of the kneaded mass is adjusted to pH=6 by adding ammonia water (25% solution) and kneading continues for another 30 min. The kneaded mass is then passed through a 1.8 mm die by extrusion and cut to the desired length (approx. 15-20 mm). The extrudates prepared in this way are initially air dried and then tempered as described in Example 1.

As shown in table 2, the surface-modified powders according the invention with high specific surface areas may be used to produce high strength extrudates which also have high specific surface areas and high pore volumes. Comparable $TiO_2$-based powders with high specific surface areas are not known in the related art.

The improved strength of the extrudates due to the addition of auxiliary shaping agents before drying at the suspension stage is particularly surprising, since the addition of these same auxiliary shaping agents during the kneading process does not significantly affect the strength thereof, as is shown by comparison example 2.

TABLE 1

Powder properties

| Example | Spec. surface area (5 pt BET) [m²/g] | Pore volume (Total) [cm³/g] | $TiO_2$ content [% by wgt.] | C content [% by wgt.] | $SO_4$ content [% by wgt.] | Crystallite size [nm] | Phase |
|---|---|---|---|---|---|---|---|
| Comparison example 1 | 346 | 0.31 | 88.9 | 0.15 | 0.78 | 7 | Anatase |
| Comparison example 2 | 312 | 0.30 | 86.7 | 0.12 | 1.50 | 8 | Anatase |
| Comparison example 3 | 354 | 0.81 | 84.8 | n.d. | 0.71 | 8 | Anatase |
| Example 1 | 333 | 0.32 | 84.4 | 0.79 | 1.3 | 8 | Anatase |
| Example 2 | 327 | 0.30 | 85.3 | 1.40 | 0.78 | 8 | Anatase |
| Example 3 | 320 | 0.30 | 85.2 | 2.3 | n.d. | n.d. | Anatase |
| Example 4 | 316 | 0.28 | 86.4 | 1.8 | n.d. | n.d. | Anatase |
| Example 5 | 328 | 0.30 | 84.9 | 1.8 | n.d. | n.d. | Anatase |
| Example 6 | 344 | 0.32 | 88.4 | 0.55 | n.d. | n.d. | Anatase |
| Example 7 | 351 | 0.78 | 77.1 | 0.85 | 0.39 | 8 | Anatase |
| Example 8 | 349 | 0.31 | 87.7 | n.d. | 0.3 | n.d. | Anatase |
| Example 9 | 352 | 0.33 | 85.1 | n.d. | 0.31 | n.d. | Anatase |
| Example 10 | 347 | 0.31 | 86.3 | n.d. | n.d. | n.d. | Anatase |
| Example 11 | 339 | 0.32 | 87.2 | n.d. | 0.29 | n.d. | Anatase |

TABLE 2

Extrudate properties

| Example | Strength [N/mm] | Spec. surface area (5 pt. BET) [m²/g] | Pore volume (Total) [cm³/g] | Avg. pore diameter [nm] | Phase |
|---|---|---|---|---|---|
| Comparison example 1 | 5 | 106 | 0.29 | 11 | Anatase |
| Comparison example 2 | 6 | 114 | 0.30 | 10 | Anatase |
| Comparison example 3 | 4 | 126 | 0.50 | 16 | Anatase |
| Example 1 | 28 | 107 | 0.27 | 10 | Anatase |
| Example 2 | 23 | 108 | 0.26 | 10 | Anatase |
| Example 4 | 10 | 103 | 0.26 | 10 | Anatase |
| Example 7 | 10 | 130 | 0.50 | 16 | Anatase |
| Example 8 | 25 | 156 | 0.27 | n.d. | Anatase |
| Example 9 | 20 | 232 | 0.25 | n.d. | Anatase |
| Example 10 | 20 | 209 | 0.24 | n.d. | Anatase |
| Example 11 | 11 | 126 | 0.24 | n.d. | Anatase |
| Example 12 | 19 | 109 | 0.26 | | Anatase |
| Example 13 | 37 | 260 | 0.27 | | Anatase |

The invention claimed is:

1. $TiO_2$-based catalyst precursor material in powder form containing particles with the formula $TiO_{(2-x)}(OH)_{2x}$, x=0-1, wherein the particles are coated with one or more auxiliary shaping agents, and after coating and drying have a specific surface area of at least 150 m²/g and comprise:

50-99.5% by weight of one or more titanium-oxygen compounds with the general formula $TiO_{(2-x)}(OH)_{2x}$, wherein x=0 to 1, wherein the crystalline phases of the one or more titanium-oxygen compounds are in the anatase form, and 0.5-50% by weight of the one or more auxiliary shaping agents, which evaporates, sublimates and/or decomposes at temperatures below 915° C., wherein the % by weight are relative to the total weight of the dried catalyst precursor material.

2. $TiO_2$-based catalyst precursor material in powder form according to claim 1, comprising:

70-99.5% by weight of the one or more titanium-oxygen compounds with the general formula $TiO_{(2-x)}(OH)_{2x}$ wherein x=0, and 0.5-30% by weight of the one or more auxiliary shaping agents, wherein the % by weight are relative to the total weight of the dried catalyst precursor material.

3. $TiO_2$-based catalyst precursor material in powder form according to claim 1 further comprising 0.1-20% by weight $SiO_2$ and/or $Al_2O_3$, wherein the % by weight are relative to the total weight of the dried catalyst precursor material.

4. $TiO_2$-based catalyst precursor material in powder form according to claim 1 further comprising 0.1-30% by weight $CaSO_4$, $BaSO_4$ or a mixture thereof, wherein the % by weight are relative to the total weight of the dried catalyst precursor material.

5. $TiO_2$-based catalyst precursor material in powder form according to claim 1, wherein the one or more auxiliary shaping agents is selected from the group consisting of:

an organic hydrocarbon containing at least one functional group selected from the group consisting of hydroxy, carboxy, amino, imino, amido, ester, sulfonyl, keto, and thio analogues thereof, or mixtures thereof, carbohydrates selected from the group consisting of cellulose, cellulose ether, methyl cellulose, glucose, polyacryl amines, polyvinyl alcohol, stearic acid, polyethylene glycol and mixtures thereof, ammonia, alkanol amine or an ammonia-releasing compound or mixtures thereof, and nitric acid.

6. $TiO_2$-based catalyst precursor material in powder form according to claim 1 having a pore volume of at least 0.25 $cm^3/g$.

7. Method for producing the $TiO_2$-based catalyst precursor material in powder form according to claim 1, comprising:

an aqueous suspension of titanium oxide hydrate particles and/or hydrated titanium dioxide particles having the general formula $TiO_{(2-x)}(OH)_{2x}$ (0<x≤1) is mixed with the auxiliary shaping agent or a suspension or solution of the auxiliary shaping agent, and the suspension obtained is dried at a temperature below 150° C. and, optionally undergoes a grinding step.

8. Method for producing the $TiO_2$-based catalyst precursor material in powder form according to claim 7, wherein:

the aqueous suspension of titanium oxide hydrate particles and/or hydrated titanium dioxide particles having the general formula $TiO_{(2-x)}(OH)_{2x}$ (0<x≤1) is obtained in that a suspension of metatitanic acid is neutralised with an alkali, optionally, the neutralized metatitanic acid is washed with water, optionally, the washed metatitanic acid is readsorbed.

9. Method for producing the $TiO_2$-based catalyst precursor material in powder form according to claim 8, wherein the suspension of metatitanic acid is neutralized with an alkali selected from the group consisting of NaOH, ammonia, calcium carbonate, calcium hydroxide, and $Ba(OH)_2$.

10. Method for producing the $TiO_2$-based catalyst precursor material in powder form according to claim 8, wherein the neutralized metatitanic acid is washed with water until it has a conductivity not greater than 500 ρS/cm.

11. Method for producing the $TiO_2$-based catalyst precursor material in powder form according to claim 7, wherein the titanium oxide hydrate particles and/or hydrated titanium dioxide particles having the general formula $TiO_{(2-x)}(OH)_{2x}$ (0<x≤1) in the aqueous suspension have an average particle size of 5 nm-5 μm.

12. Method for producing the $TiO_2$-containing shaped parts according to claim 11, wherein the mixture obtained is extruded with an extruder as the moulding device to form a string-like extrudate.

13. Method for producing the $TiO_2$-containing shaped parts according to claim 12, in which the quantity of water is selected such that the mixture obtained can be extruded as a kneaded paste by the extruder at a pressure of 1 to 200 bar to form an extrudate.

14. Method for producing the $TiO_2$-containing shaped parts according to claim 12, in which the extrudate is dried in a temperature range from 80-120° C., for 60 to 120 min, and then annealed for 1-4 hours at 300° to 600°.

15. Method for producing the $TiO_2$-based catalyst precursor material in powder form according to claim 7, wherein the suspension obtained after the addition of the auxiliary shaping agent solution undergoes a maturation step for 10 min up to 24 h at temperatures from 20-80° C.

16. $TiO_2$-based catalyst precursor material according to claim 1, wherein the particles have a specific surface area of at least 300 $m^2/g$.

17. Method for producing the $TiO_2$-containing shaped parts comprising:

a catalyst precursor material in powder form according to claim 1 is mixed with a peptizing agent and water, and optionally a further additive selected from the group consisting of plasticizers, binders, bases, lubricants and pore forming agents, or mixtures thereof, to form a mixture, the mixture obtained thereby undergoes a further mixing process, the mixture obtained thereby is moulded in a moulding device to create a shaped part, the shaped part is dried at a temperature below 150° C. and then calcined at a temperature below 915° C.

18. $TiO_2$-containing shaped part produced according to the method according to claim 17.

19. A catalyst or carrier for a catalytically active metal comprising a $TiO_2$-containing shaped part according to claim 18 in a process selected from the group consisting of photocatalysis, Claus catalysis, Claus tail gas treatment, SCR, hydrotreating, gas-to-liquid processes, and Fischer-Tropsch processes.

20. A catalyst or carrier for catalytically active metal comprising a $TiO_2$-based catalyst precursor material according to claim 1 in a process selected from the group consisting of photocatalysis, Claus catalysis, Claus tail gas treatment, SCR, hydrotreating, gas-to-liquid processes, and Fischer-Tropsch processes.

* * * * *